R. J. NEELY.
COUPLING DEVICE FOR VEHICLES.
APPLICATION FILED JULY 24, 1919.
1,389,840.  Patented Sept. 6, 1921.
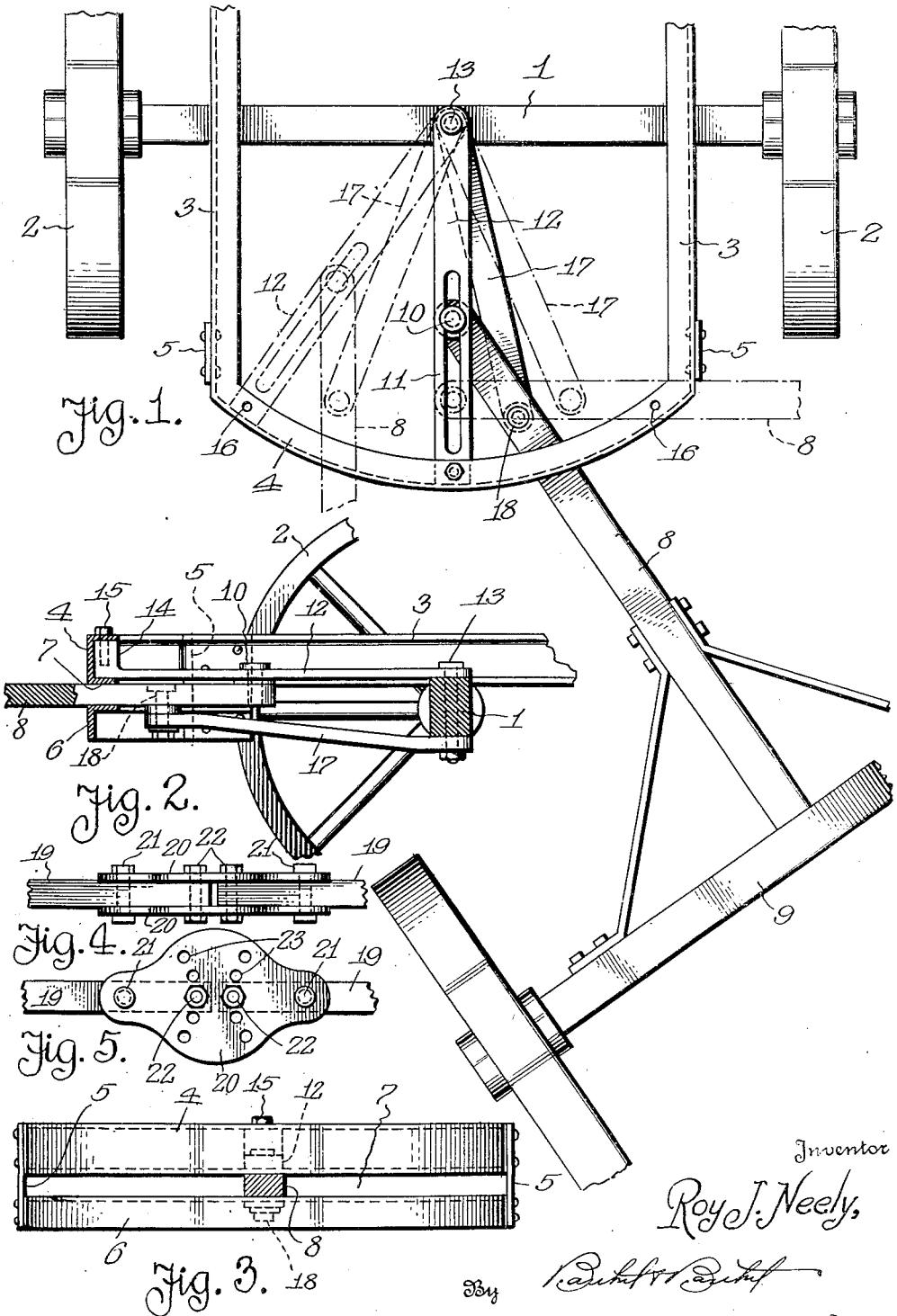

UNITED STATES PATENT OFFICE.

ROY J. NEELY, OF DETROIT, MICHIGAN, ASSIGNOR TO LIBERTY TRACTOR CORPORATION, OF DETROIT, MICHIGAN, A CORPORATION OF MICHIGAN.

COUPLING DEVICE FOR VEHICLES.

1,389,840.  Specification of Letters Patent.  Patented Sept. 6, 1921.

Application filed July 24, 1919. Serial No. 313,014.

*To all whom it may concern:*

Be it known that I, ROY J. NEELY, a citizen of the United States of America, residing at Detroit, in the county of Wayne and State of Michigan, have invented certain new and useful Improvements in Coupling Devices for Vehicles, of which the following is a specification, reference being had therein to the accompanying drawings.

My invention aims to provide a novel coupling device by which one vehicle may be connected to another to be drawn thereby and the coupling device is designed so that a shorter turn than usual may be made by the vehicles. It is in this connection that the coupling device may be advantageously used between a truck and trailer; a tractor and farm implement, and between any cars or vehicles, whether as a unit or train. In coupling a vehicle to a power vehicle so that a shorter turn may be made, less attention is required by the driver of the power vehicle when turning corners, and it is furthermore possible to quickly place the drawn vehicle at any desired angle relative to the power vehicle, particularly when backing the drawn vehicle against a curb for loading or unloading purposes.

My invention further aims to provide a vehicle coupling device that may be adapted to serve as a draft gear, especially between a tractor and farm implements to be drawn thereby. It is possible to position the coupling so that a drawn implement will be set to one side or the other of the tractor, thus permitting of cultivation and other operations being carried on in a desired manner.

My invention further aims to provide a strong, durable and inexpensive coupling device applicable to many vehicles, and the construction entering into the device will be hereinafter considered and then claimed.

Reference will now be had to the drawings, wherein—

Figure 1 is a plan of the coupling device, showing by dot and dash lines different positions a drawn vehicle may assume relative to a power vehicle;

Fig. 2 is a longitudinal sectional view of the coupling device,

Fig. 3 is a rear end view of the same;

Fig. 4 is a plan of a tongue adjusting member, and

Fig. 5 is an elevation of the same.

In the drawing, the reference numeral 1 denotes a rear axle having wheels 2 and on the rear axle are side frames 3 of a chassis or running gear, said side frames having the rear ends thereof connected by a curved end frame 4. The frames 3 and 4 are preferably made of channel steel or other durable metal with the channels open at the inner sides of the frames.

The rear ends of the frames 3 are provided with depending side plates 5 supporting a curved end frame 6 below the frame 4 and in parallelism therewith so as to provide a lateral slot 7 between said end frames. The lower end frame 6 is preferably made of an angle bar having one of its flanges confronting one of the flanges of the channel end frame 4, so that said flanges may coöperate in forming a support and guide for the tongue 8 of a drawn vehicle or trailer 9. The front axle or truck of the drawn vehicle or trailer has been shown simply as an example of a vehicle or implement that may be pulled by a power vehicle represented by the rear axle 1 and the frames 3.

The forward end of the tongue 8 has a stud 10, said stud extending into a longitudinal slot 11 in an adjustable member 12 supported by the axle 1 and the upper end frame 4. The adjustable member 12 has its forward end pivotally connected to the axle 1 by a king bolt 13 and the rear end of said adjustable member has a head 14 slidable in the channel upper end frame 4 and adapted to be held relative thereto by a pin 15 or other detachable fastening means. The upper flange of the end frame 4 has openings 16 to accommodate the pin 15 and by removing the pin 15 the member 12 may be swung on its pivot and positioned at a desired angle relative to the axle 1, as shown by dot and dash lines in Fig. 1. The purpose of this adjustment will hereinafter appear.

17 denotes a reach or radius member which has its forward end held under the axle 1 by the king bolt 13, and the rear end of said radius member is pivotally connected, by a pin 18 or other pivotal means to the tongue 8, said pivotal connection being normally between the forward end of the tongue and the lower end frame 6, so that said radius member may coöperate with the slotted longitudinal member 12 in maintaining the forward end of the tongue 8 in engagement with the rear end of the vehicle frame.

When the trailer is following in the path of the power vehicle the connection between the trailer and the power vehicle is established solely through the radius member 17, but when passing around a corner, over a curved section of road, or making a turn that causes the tongue 8 to assume an angle relative to the longitudinal slotted member 12, then a portion of the load is assumed by the longitudinal member 12 due to the end of the tongue bearing against said member. This is particularly true when the member 12 is adjusted for draft purposes so that the tongue 8 is set to one side to draw the trailer or implement in a path other than that of the power vehicle. In either instance, it is possible for the trailer vehicles to make a short turn and this is a desideratum in connection with farm implements operating in a field.

The principle of my invention has been embodied in this application, but it is obvious that any suitable means may be employed to compensate for any inequalities in height between the tongue 8 and the chassis or frame of the power vehicle. As an instance of such means, I illustrate in Fig. 4 a sectional tongue 19 having side plates 20 pivotally connected thereto, as at 21, and the ends of said tongue sections adjustably connected to said plates, as at 22. With the plates 20 having a series of openings 23 for the tongue connecting means it is possible to position one tongue section relative to the other so that a drawn implement will have a desired position.

While in the drawing there is illustrated a preferred embodiment of my invention, it is to be understood that the structural elements are susceptible to such variations and modifications as fall within the scope of the appended claims.

What I claim is:—

1. The combination of a vehicle axle, end frames supported from said axle, a longitudinal member connected to said axle and said end frames, a trailer tongue extending between said end frames and slidably held relative to said longitudnial member, and means connecting said tongue to said axle.

2. The combination set forth in claim 1, wherein said means includes a radius member connected to said axle and the lower face of said tongue.

3. The combination set forth in claim 1, wherein said longitudinal member has one end pivoted to said axle and the other end adjustably held relative to said end frames.

4. The combination of a vehicle axle, end frames supported from said axle, a longitudinal member connected to said axle and said end frames, a trailer tongue having its forward end held relative to said member so that it may assume a position at an angle to said member, and a direct connection between said axle and said tongue relieving said member of any strain when said tongue alines with said member.

5. In a vehicle train, an axle, a trailer, a swingable member connected to said axle and adapted to swing in a horizontal plane, and means connecting said trailer to said vehicle and said swingable member so that the draft of said trailer is other than at one point on said axle.

6. A vehicle having an axle, an upper frame supported on said axle, a lower frame supported from said upper frame, an adjustable member connecting the upper frame to said axle, a tongue extending between said upper and lower frames and loosely connected to said adjustable member, and a radius member pivotally connected to said axle and to said tongue.

7. A vehicle as characterized in claim 6, wherein the pivotal connection between said radius member and axle serves as an axle connection for said adjustable member.

In testimony whereof I affix my signature in the presence of two witnesses.

ROY J. NEELY.

Witnesses:
H. C. UNDERWOOD,
KARL H. BUTLER.